US009686741B2

(12) United States Patent
Kaikkonen et al.

(10) Patent No.: US 9,686,741 B2
(45) Date of Patent: Jun. 20, 2017

(54) METHOD AND APPARATUS FOR MANAGEMENT OF MULTIPLE COMMUNICATION CHANNELS

(71) Applicant: Nokia Technologies Oy, Espoo (FI)

(72) Inventors: Jorma Johannes Kaikkonen, Oulu (FI); Ilkka Antero Keskitalo, Oulu (FI); Jussi-Pekka Koskinen, Oulu (FI); Lars Dalsgaard, Oulu (FI); Jarkko Tuomo Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/435,901

(22) PCT Filed: Oct. 26, 2012

(86) PCT No.: PCT/IB2012/055931
§ 371 (c)(1),
(2) Date: Apr. 15, 2015

(87) PCT Pub. No.: WO2014/064491
PCT Pub. Date: May 1, 2014

(65) Prior Publication Data
US 2015/0296456 A1    Oct. 15, 2015

(51) Int. Cl.
*H04W 52/02*    (2009.01)
*H04L 12/24*    (2006.01)
(Continued)

(52) U.S. Cl.
CPC ..... *H04W 52/0216* (2013.01); *H04L 41/0803* (2013.01); *H04W 68/12* (2013.01);
(Continued)

(58) Field of Classification Search
CPC ......... H04W 72/1215; H04W 72/1284; H04W 88/06
See application file for complete search history.

(56) References Cited

U.S. PATENT DOCUMENTS

2009/0093280 A1*  4/2009  Kitazoe .............. H04W 76/046
                                                          455/574
2011/0243047 A1   10/2011  Dayal et al.
(Continued)

OTHER PUBLICATIONS

International Search Report and Written Opinion received for corresponding Patent Cooperation Treaty Application No. PCT/IB2012/055931 dated Dec. 3, 2013, 15 pages.
(Continued)

*Primary Examiner* — Pao Sinkantarakorn
(74) *Attorney, Agent, or Firm* — Mintz Levin Cohn Ferris Glovsky and Popeo, P.C.

(57) ABSTRACT

A method, apparatus and computer program product are therefore in order to enable efficient management of multiple communication channels. In this regard, the method, apparatus, and computer program product may utilize a user equipment (UE) (208), such as a mobile terminal, to communicate a plurality of networks. The UE (208) may identify that multiple communication networks are available or in use, and notify a network node (204, 206) associated with one of the networks of the communication status. In response to receiving a notification that UE (208) is communicating across an alternate channel, the network node (204, 206) may reconfigure the channel with which the network node (204, 206) communicates with the UE (208), or instruct the UE (208) to do the same.

23 Claims, 5 Drawing Sheets

(51) Int. Cl.
*H04W 68/12* (2009.01)
*H04W 76/02* (2009.01)
*H04W 88/06* (2009.01)

(52) U.S. Cl.
CPC .......... *H04W 76/023* (2013.01); *H04W 88/06* (2013.01); *Y02B 60/50* (2013.01)

(56) References Cited

U.S. PATENT DOCUMENTS

| | | |
|---|---|---|
| 2012/0069766 A1 | 3/2012 | Fu et al. |
| 2012/0207040 A1 | 8/2012 | Comsa et al. |
| 2015/0201375 A1* | 7/2015 | Vannithamby ........ H04W 24/04 370/311 |

OTHER PUBLICATIONS

R-2 124646 Introducing common UE assistance procedure; Samsung; 3GPP TSG-RAN WG2 Meeting #79-bis; Bratislava, Slovakia, Oct. 8-12, 2012.

\* cited by examiner

METHOD AND APPARATUS FOR MANAGEMENT OF MULTIPLE COMMUNICATION CHANNELS

RELATED APPLICATION

This application was originally filed as PCT Application No. PCT/IB2012/055931 filed Oct. 26, 2012.

TECHNOLOGICAL FIELD

An example embodiment of the present invention relates generally to wireless communications, and, more particularly, to management of multiple communication channels during wireless communications.

BACKGROUND

It is increasingly common for smart phones, laptops, and other devices to contain communications interfaces that are capable of interacting with wireless data services such as 3G, WiMAX, and Long Term Evolution networks. For a variety of personal and technical reasons, it is increasingly common for some of these devices to be connected to multiple communication networks simultaneously. For example, phones may be equipped with two or more Subscriber Identification Module (SIM) cards to allow communication on two different cellular networks. Such multiple SIM card configurations may allow a single device to be associated with multiple user identities (e.g., two phone numbers associated with the same device), or they may allow the user to optimize call fees (e.g., using an alternative SIM card when in a new geographic area to avoid roaming fees on the network associated with a primary SIM card). In other circumstances, devices may be configured to communicate according to different networking technologies. For example, a device may include the ability to communicate with both cellular networks (e.g., Universal Mobile Telecommunications System (UMTS) networks or Long Term Evolution networks) and local area networks (e.g., the 802.11 family of wireless networking protocols).

The ability to communicate via multiple networks allows for various different configurations that provide an enhanced user experience. For example, certain communication standards (e.g., Simultaneous Voice Long Term Evolution) provide the capability to provide voice service via a Code Division Multiple Access (CDMA) network in parallel with data services provided by another network. However, in order to provide simultaneous access to more than one network, the mobile terminal may need to operate multiple radios, one or more for each network. Simultaneous operation of more than one radio may increase power draw, resulting in rapid depletion of battery reserves. These radios may also create interference for one another.

Although each individual network may be aware of the mobile terminal, and the mobile terminal may be aware that it is in communication with multiple networks, each network may not be aware of the complete connection status of the mobile terminal (e.g., that the mobile terminal is communicating via the other network). As such, the networks may not have sufficient data to optimally configure and control their connection to the mobile terminal. For example, a terminal may be connected to a first network continuously without an appropriate communication pattern to communicate with the second network, even though there is little traffic on the first network. In other scenarios, two radios may be active when a voice call is ongoing (e.g., in the case of Simultaneous Voice Long Term Evolution networks), causing increased battery drain and interference with one another. Similar problems exist for cases in which a single device communicates using multiple SIM cards.

BRIEF SUMMARY

A method, apparatus and computer program product are therefore provided according to an example embodiment of the present invention in order to enable efficient management of multiple communication channels. In this regard, the method, apparatus, and computer program product of an example embodiment may utilize a user equipment (UE), such as a mobile terminal, to communicate with a plurality of networks. The UE may identify certain conditions and states that are relevant to communication between the UE and the networks. For example, the UE may identify that multiple communication networks are available or in use, and notify a network node associated with one of the networks of the communication status.

In one embodiment, a method is provided that includes causing a communication with a first communication network and detecting a change in a communication status of a second communication network. Network notification parameters that identify one or more communication parameters of the second network may be determined. In response to detecting the communication with the second network, a network notification message may be caused to be transmitted to the first communication network. The network notification message may include the network notification parameters. The method may further include receiving reconfiguration information for the first communication network in response to causing transmission of the network notification message to reconfigure the first network. The reconfiguration information may include a change to at least one configuration parameter of the first communication network that to conserve power of the mobile terminal.

In some embodiments, the reconfiguration indication includes a change to at least one configuration parameter of the first communication network to avoid interference with the second communication network when the mobile terminal is communicating via the second communication network. In some embodiments, the method may also include reconfiguring the first communication network in response to receiving the reconfiguration indication. The network notification message may include at least one of a power preference indication or in-device coexistence information. In some embodiments, the second communication network is a wireless local area network and the first communication network is a cellular network. The cellular network may be a universal mobile telecommunications network or a long term evolution network. The network notification message may be caused to be transmitted in response to a change in a communication profile of the mobile terminal.

In some embodiments, the change in communication with a second network may include a change in an application communicating via the second network, a change in delay tolerance associated with the second network, a desire for a power saving configuration on the second network, a change in a preference for a continuous connection for the second network, or a change in a battery status.

In another embodiment, an apparatus is provided including at least one processor and at least one memory including computer program instructions, the at least one memory and the computer program instructions configured to, with the at least one processor, cause the apparatus at least to cause a communication with a first communication network and detect a change in a communication status of a second communication network. The processor may be further configured to determine a set of network notification parameters, where the network notification parameters identify one or more parameters of the communication with the second network. In response to detecting the communication with the second network, the processor may cause transmission of a network notification message to the first communication network. The network notification message may include the network notification parameters. The processor may be further configured to receive reconfiguration information for the first communication network in response to causing transmission of the network notification message. The reconfiguration information may include a change to at least one configuration parameter of the first communication network that to conserve power of the mobile terminal. The reconfiguration indication may include a change to at least one configuration parameter of the first communication network to avoid interference with second communication network when the mobile terminal is communicating via the second communication network. The processor may be further configured to reconfigure the first communication network in response to receiving the reconfiguration indication. The network notification message may include at least one of a power preference indication or in-device coexistence information. The second communication network may be a wireless local area network and the first communication network may be a cellular network. The cellular network may be a universal mobile telecommunications network or a long term evolution network. The network notification message may be caused to be transmitted in response to at least one of an activation of another connection or a change in a communication profile of the mobile terminal. In some embodiments, the apparatus is a user equipment. The user equipment may be a mobile phone.

In further embodiments, an apparatus is provided. This apparatus may include means for causing a communication with a first communication network, means for detecting a change in a communication status of with a second communication network, means for determining a set of network notification parameters, and means for, in response to detecting the communication with the second network, causing transmission of a network notification message to the first communication network. The network notification parameters may identify one or more parameters of the communication with the second network. The network notification message may include the network notification parameters. The apparatus may further include means for receiving reconfiguration information for the first communication network in response to causing transmission of the network notification message Embodiments may also provide a method that includes receiving a notification from a mobile terminal over a first network. The notification may indicate that that the mobile terminal is in communication with at least one network other than the first network. The method may determine one or more network configuration parameters for the first network using the notification, where the network configuration parameters are settings that optimize the mobile terminal to operate with the first network in conjunction with the at least one network other than the first network. The method may also cause configuration of the first network with the one or more network configuration parameters. The first network may be a cellular network. The notification may include a power preference indication. The notification may also include in-device coexistence information. The network configuration parameters may be determined to minimize interference of the first network with the at least one network other than the first network. In some embodiments, the network configuration parameters may be determined to minimize power usage of the mobile terminal.

Embodiments may also provide an apparatus comprising at least one processor and at least one memory including computer program instructions. The computer program instructions may cause the at least one processor and the at least one memory to receive a notification from a mobile terminal over a first network. The notification may indicate that that the mobile terminal is in communication with at least one network other than the first network. The processor may be further configured to determine one or more network configuration parameters for the first network using the notification, wherein the network configuration parameters are settings that optimize the mobile terminal to operate with the first network in conjunction with the at least one network other than the first network, and cause configuration of the first network with the one or more network configuration parameters. The first network may be a cellular network. The notification may include a power preference indication. The notification may additionally or alternatively include in-device coexistence information. The network configuration parameters may be determined to minimize interference of the first network with the at least one network other than the first network and/or to minimize power usage of the mobile terminal.

Further embodiments may provide an apparatus, where the apparatus includes means for receiving a notification from a mobile terminal over a first network, the notification indicating that that the mobile terminal is in communication with at least one network other than the first network, means for determining one or more network configuration parameters for the first network using the notification, wherein the network configuration parameters are settings that optimize the mobile terminal to operate with the first network to operate in conjunction with the at least one network other than the first network, and means for causing configuration of the first network with the one or more network configuration parameters.

BRIEF DESCRIPTION OF THE DRAWINGS

Figure 1:
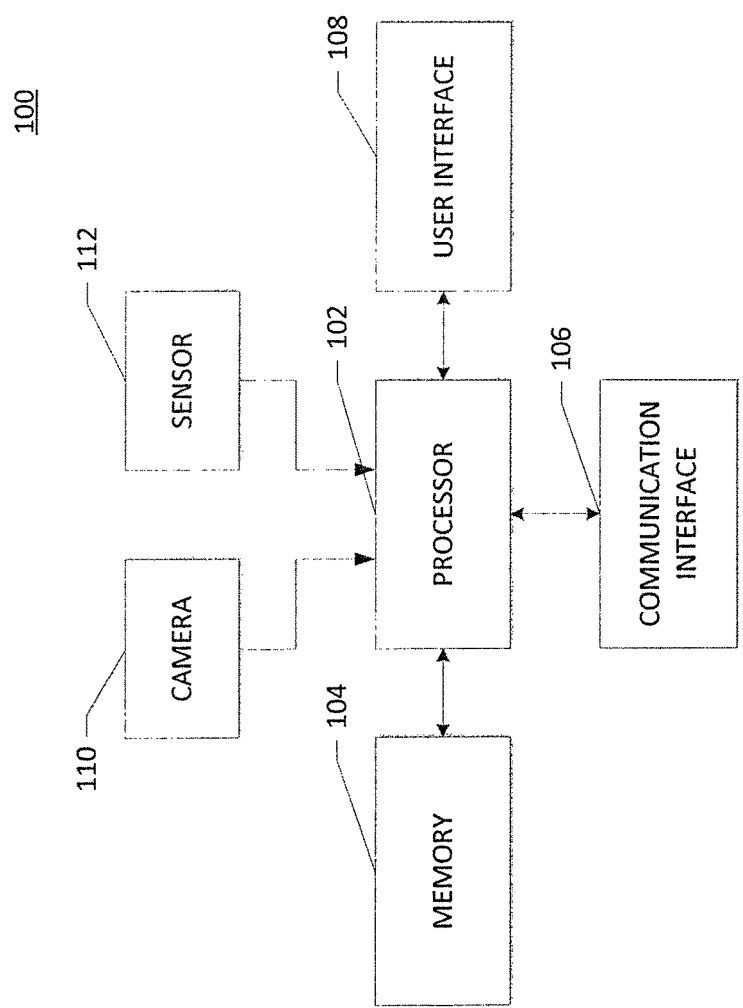
Figure 2:
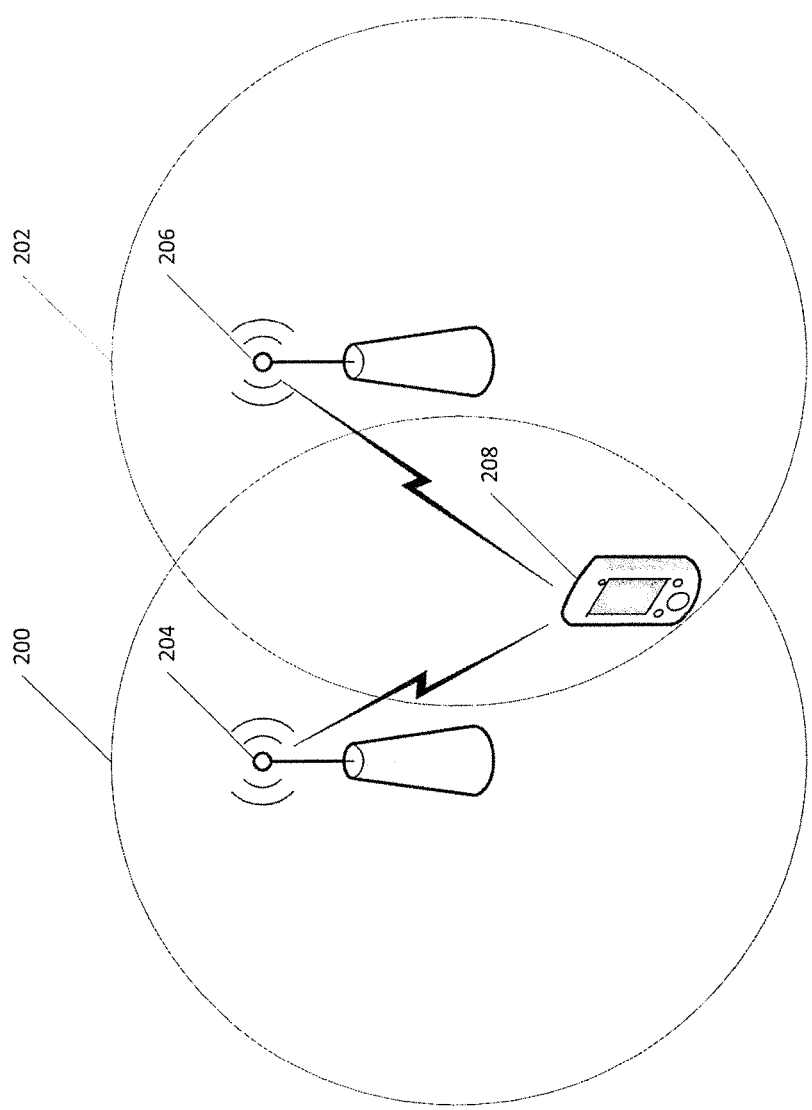
Figure 3:
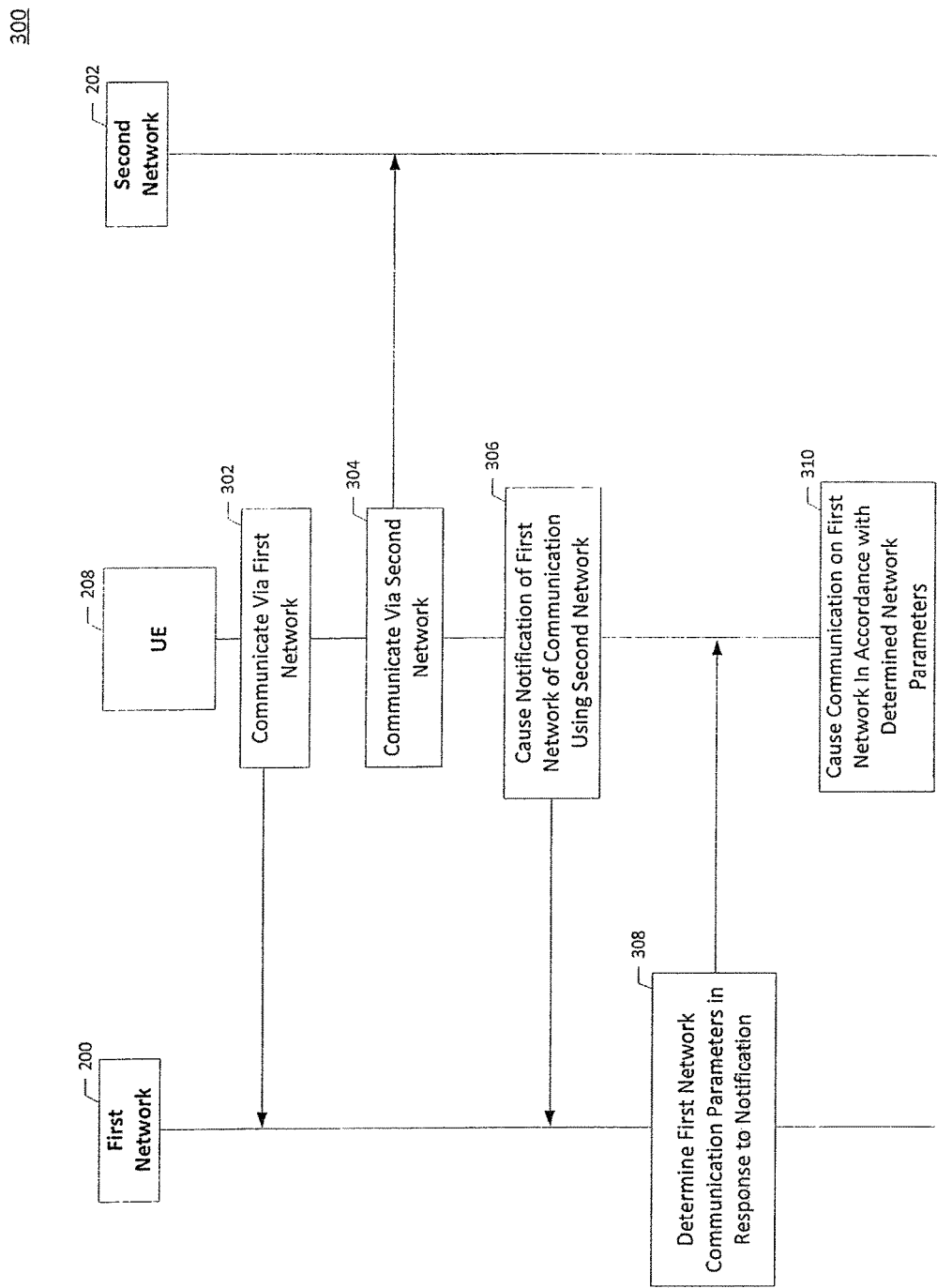
Figure 4:
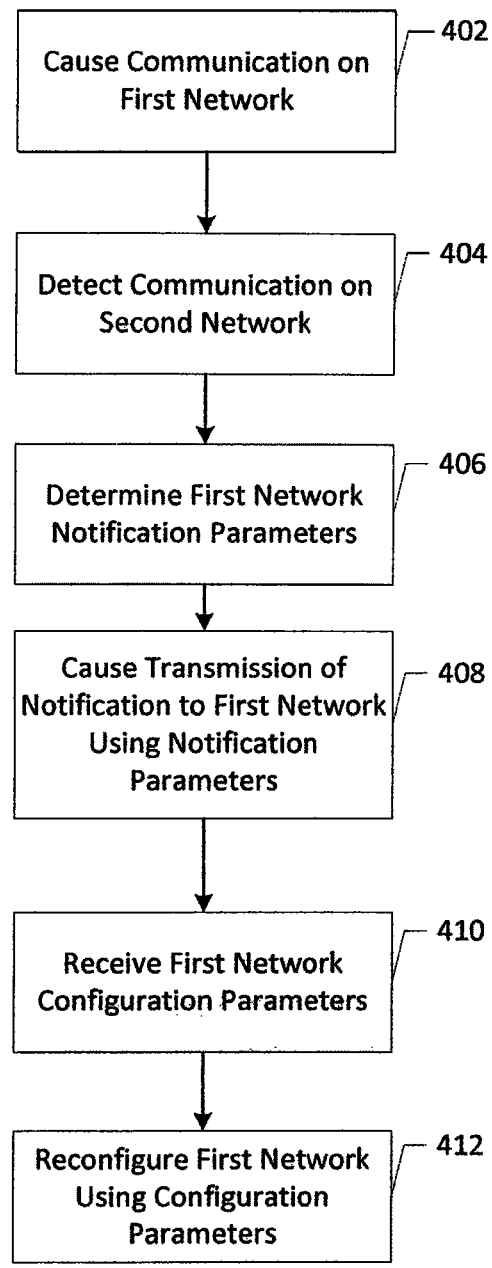
Figure 5:
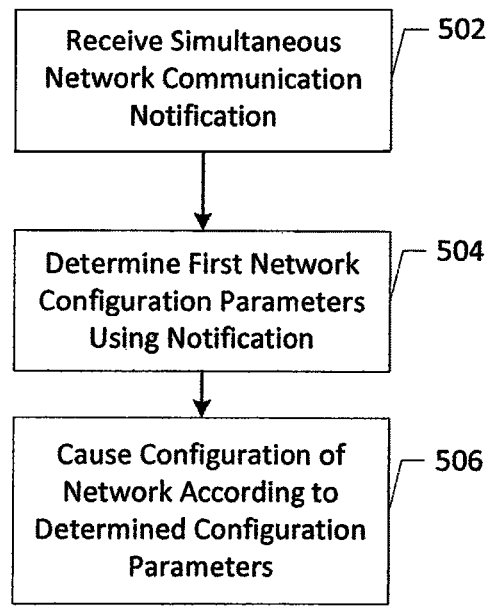

Having thus described certain embodiments of the invention in general terms, reference will now be made to the accompanying drawings, which are not necessarily drawn to scale, and wherein:

FIG. 1 is a block diagram of an apparatus that may be specifically configured in accordance with an example embodiment of the present invention;

FIG. 2 is a schematic diagram of an example mobile terminal in communication with multiple communication networks in accordance with an example embodiment of the present invention;

FIG. 3 is a signaling diagram of a message flow between a UE and a plurality of communication networks in accordance with an example embodiment of the present invention;

FIG. 4 is a flow diagram of a method for management of multiple communication networks in accordance with an example embodiment of the present invention; and FIG. 5 is a flow diagram of a method for reconfiguring a network in response to receiving a multiple communication network notification in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device. As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with an example embodiment of the present invention in order to manage multiple communication channels. A method, apparatus and computer program product of an example embodiment may operate to enable communications between a UE and a plurality of networks. The UE may provide a first network with status information relating to the UE's communication with other networks. In this manner, the first network may appropriate configure communication with the UE to optimize power and interference properties of the communication across the networks. For example, the network may enable power-saving features such as by reconfiguring a data reception timer (e.g., a DRX timer as specified in the Long Term Evolution standard), or optimizing data transmission windows to avoid interference with the other networks.

The system of an embodiment of the present invention may include an apparatus 100 as generally described below in conjunction with FIG. 1 for performing one or more of the operations set forth by FIGS. 2-4 and also described below. The apparatus will be described in terms of a UE or a network node for the purposes of example, but the apparatus 100 may also be embodied in another type of computing device, either mobile or fixed, such as a computer workstation, a personal computer, a laptop, a cellular phone, or a smart phone. In this embodiment, the apparatus 100 may be in communication with a display and/or a data network, either directly, such as via a wireless or wireline connection, or indirectly via one or more intermediate computing devices. The display and the apparatus 100 may be parts of the same system in some embodiments. However, the apparatus 100 may alternatively be embodied by another computing device that is in communication with the display and the mobile terminal, such as via a wireless connection, a wireline connection or the like. For example, the apparatus may be a mobile telephone, a personal digital assistant (PDA), a pager, a laptop computer, a tablet computer, a data card, a USB dongle, a cellular modem, a cellular base tower, an enhanced Node B (eNB), or any of numerous other hand held or portable communication devices, computation devices, content generation devices, content consumption devices or combinations thereof.

It should also be noted that while FIG. 1 illustrates one example of a configuration of an apparatus 100 for managing communication channels, numerous other configurations may also be used to implement other embodiments of the present invention. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

Referring now to FIG. 1, the apparatus 100 for managing communication channels in accordance with example embodiments may include or otherwise be in communication with one or more of a processor 102, a memory 104, a communication interface 106, a user interface 108, a camera 110 and a sensor 112. In some embodiments, the processor (and/or co-processors or any other processing circuitry assisting or otherwise associated with the processor) may be in communication with the memory device via a bus for passing information among components of the apparatus. The memory device may include, for example, a non-transitory memory, such as one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

In some embodiments, the apparatus 100 may be embodied as a chip or chip set.

In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 102 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 102 may be configured to execute instructions stored in the memory device 104 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 106 may be any means such as a device or circuitry embodied in either hardware or a combination of hardware and software that is configured to receive and/or transmit data from/to one or more networks and/or any other device or module in communication with the apparatus 100, such as by supporting communications with a display and/or a mobile terminal. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms. The communication interface 106 may serve to couple the apparatus 100 to a cellular network, such as a network operating according to a Universal Mobile Telecommunication System (UMTS), 3G, Long Term Evolution, or Long Term Evolution-Advanced protocol.

The apparatus 100 may include a user interface 108 that may, in turn, be in communication with the processor 102 to provide output to the user and, in some embodiments, to receive an indication of a user input. For example, the user interface may include a display and, in some embodiments, may also include a keyboard, a mouse, a joystick, a touch screen, touch areas, soft keys, a microphone, a speaker, or other input/output mechanisms. In one embodiment, the display of the apparatus may be embodied by a liquid crystal display (LCD) screen presented on one surface of the mobile terminal. The processor 102 may comprise user interface circuitry configured to control at least some functions of one or more user interface elements such as a display and, in some embodiments, a speaker, ringer, microphone and/or the like. The processor 102 and/or user interface circuitry comprising the processor 102 may be configured to control one or more functions of one or more user interface elements through computer program instructions (e.g., software and/or firmware) stored on a memory accessible to the processor (e.g., memory 104, and/or the like).

In some example embodiments, the apparatus 100 may include an image capturing element, such as a camera 110, video and/or audio module, in communication with the processor 102. The image capturing element may be any means for capturing an image, video and/or audio for storage, display or transmission. For example, in an example embodiment in which the image capturing element is a camera, the camera may include a digital camera capable of forming a digital image file from a captured image. As such, the camera may include all hardware (for example, a lens or other optical component(s), image sensor, image signal processor, and/or the like) and software necessary for creating a digital image file from a captured image. Alternatively, the camera may include only the hardware needed to view an image, while a memory device 104 of the apparatus stores instructions for execution by the processor in the form of software necessary to create a digital image file from a captured image. In an example embodiment, the camera 110 may further include a processing element such as a co-processor which assists the processor in processing image data and an encoder and/or decoder for compressing and/or decompressing image data. The encoder and/or decoder may encode and/or decode according to, for example, a joint photographic experts group (JPEG) standard, a moving picture experts group (MPEG) standard, or other format.

As shown in FIG. 1, the apparatus 100 may also include one or more sensors 112, such as a location information receiver (e.g., a GPS receiver), an accelerometer, a gyroscope, a compass, or the like, that may be in communication with the processor 102 and may be configured to determine the location of the apparatus and to detect changes in motion and/or orientation of the apparatus.

The method, apparatus 100 and computer program product may now be described in conjunction with the operations illustrated in FIGS. 2-4. In this regard, the apparatus may include means, such as the processor 102, the communications interface 106, or the like, for managing multiple communication networks. The apparatus 100 may communicate via a plurality of communication networks (e.g., cellular and WLAN networks, multiple cellular networks, etc.). When communicating with two or more networks, the apparatus 100 may notify one or more of the networks of the communication status of the apparatus 100. For example, the apparatus 100 may indicate to a first network that communications have been initiated on a second network. This notification may include of the type of communications occurring on each network (e.g., an indication that the first network is a cellular network and the second network is a WLAN). The apparatus 100 may receive configuration information from the first network in response to the notification, as the first network optimizes communication on the first network in view of the other communications networks with which the apparatus 100 is in communication.

In cases where the apparatus 100 functions as a UE, the processor 102 may be employed as a processing means. The processing means may cause communication via a plurality of networks, and cause at least one of the plurality of networks to be notified of a communication status of the apparatus. A set of configuration data may be received from the first network in response to notification of the communication status, and the processing means may cause reconfiguration of the apparatus 100 in response to the configuration data.

In some embodiments, the apparatus 100 may function as a network node, such as a WLAN base station or a cellular tower. Where the apparatus 100 is a network node, it may be operable to receive a notification from a UE that the UE is configured to communicate according to a plurality of networks. The apparatus 100 may determine network configuration information from the notification, and configure the network accordingly to optimize communications with the UE. The apparatus 100 may also transmit configuration information to the UE to enable the UE to also optimize the communication process. Although the apparatus 100 is described as reconfiguring the network in response to receiving a notification from the UE, the apparatus 100 may also determine that no reconfiguration is necessary (e.g., if the communication network is already optimally configured for communication with the UE in view of the notification), and thus the apparatus 100 may take no action in response to receiving the notification. The processor 102 may function as a processing means for receiving the notification, determining the network configuration, and causing reconfiguration of the communication network and causing transmission of configuration information to the UE.

FIG. 2 is a schematic diagram of an example UE in communication with a plurality of communication networks in accordance with an example embodiment of the present invention. FIG. 2 depicts a first network 200 including a network node 204 and a second network 202 including a second network node 206 in communication with a UE 208. The UE 208 may be configured for simultaneous communication via both networks. For example, the first network 200 may be a UMTS network providing cellular communications according to a Global System for Mobile Communications standard and the second network 202 may be a WLAN network. Alternately, both networks may be provided according to the same communications protocol (e.g., two UMTS networks), such as where the UE 206 is a cellular phone configured with multiple SIM cards. The first and second network nodes 204 and 206 may function to allow the UE 208 to communicate with the first and second networks, respectively.

The first and second network nodes 204 and 206 may be towers or sets of towers for providing coverage to the cell of the network. The first and second wireless networks 200, 202 may be provided according to one or more wireless protocols, such as 3G or Long Term Evolution. Examples of network nodes may include, but are not limited to, 3G "Node B" or "Radio Network Controller" nodes, or Long Term Evolution "Enhanced Node B" (eNodeB) nodes. In some embodiments, one or more of the first and second wireless networks 200, 202 may be a WLAN, such as a home wireless network provided according to one of the 802.11 protocol standards. In such embodiments, the network node may be a wireless router or other device configured to allow communication via the respective network. As described above, the UE 204 may be any type of mobile terminal, laptop, desktop, cellular modem, data card, USB dongle, or computing device capable of wireless communication with the network node 202.

The UE 208 and the network nodes 204, 206 may communicate data over various frequencies of the spectrum. Communications may be enabled between these devices according to various scheduling methods, such as time division multiple access (TDMA), code division multiple access (CDMA), or one or more of the 802.11 protocols. In some embodiments, the network nodes 204, 206 may enable coordinated communication with the UE 208. For example, the UE 208 may provide voice communications according to a Simultaneous Voice Long Term Evolution standard, and voice data may be provided via CDMA using the first network 200 and data may be provided via a Long Term Evolution standard using the second network 202. In some multiple network situations, it may not be optimal for the UE 208 to communicate via both networks 200, 202 simultaneously. For example, enabling separate radios to communicate with both networks may exceed a maximum current provided by a battery powering the UE 208, or enabling communication with the first network 200 may cause interference with the second network 202. In order to reduce the potential negative side effects caused by simultaneous communication on multiple networks, the UE 208 may notify one or more of the network nodes 204, 206 that the UE 208 is in simultaneous communication with another network. This notification may include information about each network with which the UE 208 is in communication. For example, the UE 208 may indicate the communication protocol and/or type of each network (e.g., Bluetooth®, 802.11, UMTS, CDMA2000, etc.). The UE 208 may also specify information about each network, such as transmission windows, communication frequencies, or the like. In some embodiments, the information may include In-Device Coexistence (IDC) interference data for the networks on which the UE 208 is communicating.

The notification may be provided to the network nodes 204, 206 using known messaging types, such as a Power Preference Indication (PPI) message or an IDC message. Alternately, a new message type may be defined for transmission of the simultaneous network notification. The notification may be sent with a Radio Resource Control (RRC) message (e.g., an Uplink RRC). The RRC message may include a message type that indicates that the transmission includes notification of multiple simultaneous networks in communication with the UE 208. For example, the RRC message may be known as a "UEAssistanceInformation" message type, and the message type may be defined to include PPI information in addition to information that informs the network that the UE 208 is using a particular type of communication protocol (e.g., WLAN) in addition to the network upon which the RRC message is transmitted. Alternately, such a notification could be sent as part of a Signaling Connection Release Indication message, as defined in 3GPP Technical Standard 25.331.

In addition to the type of network communications and interference data, the message may also include other information that allows the network node to optimize communication with the UE 208. In some embodiments, the message may include whether the user of the UE 208 is active. For example, the UE 208 may be indicated as active if a key has been pressed within a particular time period, if the screen saver is not currently enabled, or the like. Conversely, the UE 208 may be indicated as inactive if a key has not been pressed within the time period or the screen saver is enabled.

In some embodiments, the message may include information as to whether particular applications are active or inactive. For example, a particular application may initiate a messaging process to inform the network of its presence, and provide an identifier in the message. Alternatively, the application may provide information to a connection manager or other intermediate function which is responsible for management of the data transfer to the network. In yet further additional or alternative cases, an intermediate application may monitor application status on the UE 208 and inform the network of such statuses.

In further embodiments, the message may indicate whether the applications executing on the UE 208 are delay tolerant. Delay tolerance may be specified by the applications themselves, or determined by an application manager executing as an intermediate application for communication with the network node. Delay tolerance may also be related to a type of application. For example, the message may indicate that a particular application is a gaming or streaming application, and thus less tolerant of delay or connection quality drops. Other example application types may include voice, interactive video, web browsing, instant messaging, status updates, or the like.

In some embodiments, the message may include data indicating whether applications are executing in a foreground mode or a background mode, with background mode execution generally indicating that an application is more tolerant of delays and/or drops in signal quality.

In some embodiments, the UE 208 may indicate a desire for a power saving configuration in the message. For example, the UE 208 may indicate that one or more applications have stopped, and a longer reception delay timer may be enforced to reduce power consumption.

In some embodiments, the message may also include an indication of active or inactive data transmissions. For example, an application may indicate how often new data is expected or a delay period during which no data is expected. Such information may be included in the message. Additionally or alternatively, an application manager may aggregate such information from all running applications and provide the information to the radio layers.

In yet further embodiments, the message may include information indicating whether a continuous connection is desired by the UE, or whether the UE desires release of the connection. This information may serve to explicitly request a network reconfiguration.

In some embodiments, the message may include a preference indicator for a delay timer or a particular Physical Uplink Control Channel (PUCCH) configuration. The message may include information about the connection parameters affecting power consumption and connection quality. For example, parameters may be related to a delay timer for reception operations (e.g., cycle length, on-duration, inactivity time). The message may also include preferences for a PUCCH configuration, such as a scheduling request interval.

In some embodiments, the message may include a current battery capacity of the UE. For example, if the battery is below a certain threshold or at low capacity, the UE may inform the network so the connection may be reconfigured to conserve battery power.

Although various embodiments of the message and data contained therein are described, various other combinations of data types may also be implemented, such that the message may include any combination of the above-referenced data values in addition to other data values not explicitly enumerated herein.

In response to receiving the notification from the UE 208, the network node 204, 206 may determine the requirements for communication with the UE 208, taking into account the various communication networks with which the UE 208 is communicating. For example, the network node 204 may alter the configuration of the network of which it is part to minimize interference with the other networks, to alter anticipated traffic estimations based on the available networks (e.g., the UE 208 may prefer another network with which it is in communication, thus lowering the likelihood that the UE 208 will communicate with the network node receiving the notification), or to enable power saving settings if the UE 208 is primarily using another network. In some embodiments, the connection may be released entirely if the network node 204 anticipates that the UE 208 will not have an immediate need of the communication channel or the UE 208 indicates as such in the notification to the network node.

In some embodiments, the UE 208 may notify the network node 204 of changes in the communication profile of the UE 208. For example, when a user is receiving data via a WLAN (e.g., browsing, reading e-mail), the UE 208 may notify a cellular network to reduce data transmission and reception (e.g., polling intervals on the cellular radio) to conserve battery power. Thus, the notification may be caused to be transmitted in response to the usage pattern of the UE 208. Examples of processing for sending and receiving these notifications is provided below with respect to FIGS. 3-5.

FIG. 3 is a signaling diagram of a message flow between a UE and a plurality of communication networks in accordance with an example embodiment of the present invention. The message flow 300 describes the communications process as messages are exchanged between a UE 208, a first network 200, and a second network 202. As the UE 208 communicates with the first network 200 and the second network 202, the UE 208 may notify one or both of the networks that the UE 208 is in simultaneous communication. These notifications may be processed by the respective networks to optimize communication with the UE 208 to take into account other networks with which the UE 208 is communicating.

At action 302, the UE 208 communicates with the first network 200. As described above with respect to FIGS. 1 and 2, the first network may be any type of communication network. At action 304, the UE 208 communicates with the second network 202, which, like the first network 200, may be any type of communication network. Although the message flow 300 depicts the UE 208 as communicating with the first network 200 prior to the second network 202, the UE 208 may communicate with the networks in any order or simultaneously. Communication with the networks may be caused by a processing means, such as the processor 102.

At action 306, the UE 208 notifies the first network 200 of communication with the second network 202. The UE 208 may cause transmission of the notification in response to beginning communication with the second network 202, in response to a communication profile change of the UE 208 (e.g., ending a voice telephone call and executing a web browser on a smart phone), or at a particular interval (e.g., the UE 208 may send the notification to the first network 200 every 5 seconds, 10 seconds, 30 seconds, etc.). As described above with respect to FIG. 2, the notification may include status information for one or more other networks to which the UE 208 is communicating other than the first network. In some embodiments, the UE 208 may send such a notification to every network with which the UE 208 is in communication. The notification may be caused to be transmitted by a processing means, such as the processor 102.

At action 308, the first network 200 may determine network communication parameters in response to the notification. For example, a network node that configures the communication between the network 200 and the UE 208 may alter one or more network settings to optimize communication with the UE 208. Optimization may include altering communication windows, (e.g. discontinuous reception (DRX) cycles), scheduling priorities, frequencies, parameter settings for power control, mobility parameters, and the like. The alternations may be performed to reduce power usage of the UE 208 if the notification indicates that the UE 208 will not need to communicate on the first network 200. As described above with respect to the apparatus 100, the first network 200 may not perform reconfiguration of the network. For example, the first network 200 may already be optimally configured for communication with both networks, and no parameter changes may be required. In some embodiments, the first network 200 may be reconfigured to avoid interference with the second network 202. Although the instant example depicts the configuration parameters as being determined by the first network, the parameters may be determined by the UE 208 and the first network in communication with one another (e.g., through a negotiation process). The network communication parameters may be determined by a processing means, such as the processor 102.

At action 310, communication between the first network 200 and the UE 208 is performed according to the network parameters determined at action 308. The first network 200 may reconfigure the network and transmit new configuration parameters to the UE 208, or the first network 200 may transmit the new configuration parameters and the reconfiguration may be performed by the UE 208. Communication according to the determined network parameters may be caused by a processing means, such as the processor 102.

FIG. 4 is a flow diagram of a method 400 for management of multiple communication networks in accordance with an example embodiment of the present invention. As described above with respect to FIGS. 1-4, a UE may operate to notify a first network that the UE is communicating via a second network. Notifying the first network of communication via the second network in this manner may enable the first network to reconfigure communications with the UE to optimize power settings, minimize interference, and otherwise improve operation of the UE. The method 400 describes a process by which the UE may inform the first network of communication on one or more second networks to allow the first network to reconfigure the communication channel between the first network and the UE. The method 400 may be performed by a processing means, such as the processor 102 described with respect to FIG. 1.

At action 402, the method 400 causes communications on a first network and at action 404, the method 400 causes communication on a second network. As described with respect to FIG. 3, the communication may be caused and occur in any order or simultaneously, and the order depicted in FIG. 4 is only provided as an example where the method causes communications on the first network prior to communications on the second network. Communication may be caused with the first and second network by a processing means, such as the processor 102.

At action 406, the method 400 determines a set of network notification parameters for transmission to a network node on the first network. A UE may assemble a collection of data describing the networks on which the UE is communicating. This information may include interference readings, network configuration settings, network types, or any other data about the networks to which the UE is connected that may be relevant to the network node for optimizing communications with the UE. As such, the UE may perform various readings and measurements, such as interference measurement, measurement of transmission and reception windows, and the like, in order to assemble data for transmission to the first network node. In some embodiments, the method 400 retrieves the network notification parameters from one or more configuration data structures associated with each network to which the UE is connected. The network notification parameters may be determined by a processing means, such as the processor 102.

At action 408, the method 400 causes transmission of a notification to the first network using the network notification parameters determined at action 406. The notification may be a particular message or message type that is populated with the network notification parameters. As described with respect to FIG. 2, the notification may include PPI information, IDC information, or the like. The notification may be sent as a RRC message such as a UEAssistanceInformation message or a Signaling Connection Release Indication message. The method 400 may send particular notification information based on the particular communication state of the UE. For example, the method 400 may include priority information based on which communication networks are actively being used by the UE for transmission or reception of data. The method 400 may also indicate to the first network that the UE is available for certain reconfiguration options. For example, the notification may include a field indicating the UE is configured to accept power preference indications for altering the power settings of the UE. Transmission of the notification may apply the rules specified for the signaling procedure for the message, e.g. a "UEAssistanceInformation", which may be used to provide this indication. The notification may be sent upon any meaningful change in a connection used by the UE other than the first network. For example, the notification may be sent during connection setup, at the start of data transmission, or when the priority of the connection is changed. Transmission of the notification may be caused by a processing means, such as the processor 102.

At action 410, the method 400 receives a set of network configuration parameters. In some embodiments, the network node may determine a new set of configuration parameters based on the notification caused to be transmitted by the method 400. The network node may transmit these parameters to the UE to reconfigure the network, or the network node may perform the configuration operation and the UE may be informed after the configuration has taken place. As such, in some embodiments, the UE is automatically reconfigured by the network after sending the notification, and in other embodiments the UE may receive instructions to perform a reconfiguration. The network configuration parameters may be received by a processing means, such as the processor 102.

At action 412, the first network is configured using the received configuration parameters. These configuration parameters may include power settings, reception window settings, or any other setting for configuring the first network so as to optimize communications of the UE in view of the UE's communication with the second network. The configuration may be performed by a processing means, such as the processor 102.

FIG. 5 is a flow diagram of a method 500 for reconfiguring a network in response to receiving a multiple communication network notification in accordance with an example embodiment of the present invention. The method 500 depicts a process by which a network node may receive notification from a UE that the UE is configured to communicate with more than one network. The method 500 determines a set of configuration parameters for the network upon which the UE and the network node are in communication using the notification information provided by the UE, and configures the network according to those configuration parameters to optimize communications with the UE. The method 500 may be performed by a processing means, such as a processor 102.

At action 502, the method 500 receives a notification that the UE is configured to communicate with more than one network. As described with respect to FIG. 4, the notification may be generated by the UE when the UE begins communication on one or more networks, at a periodic interval, or when the UE experiences a change in a communication profile. The change in the communication profile may include cases where a power preference indication is triggered to minimize power consumption, a change in the communication in the other radio connection (e.g. initiation of data transfer), or the like. The notification may be caused to be received by a processing means, such as the processor 102.

At action 504, the method 500 determines a set of network configuration parameters from using the notification. For example, the notification may provide the method 500 with configuration information regarding a one or more other networks to which the UE is connected, and the method 500 may operate to identify a set of configuration parameters that will minimize interference with the one or more other networks when the network node communicates with the UE. Additionally or alternatively, the method 500 may enable power saving features in communication with the UE, such as reducing a frequency range on which the network node communicates with the UE if the notification indicates that the UE is primarily transmitting on a different network. The network configuration parameters may be determined by a processing means, such as the processor 102.

At action 506, the method 500 causes configuration of the network according to the parameters determined at action 504. As described above with respect to FIGS. 2-4, the method 500 may cause the reconfiguration the communication network entirely on the network node, or the method 500 may cause the reconfiguration via communication with the UE. The network may be caused to be configured by a processing means, such as the processor 102.

It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 104 of an apparatus employing an embodiment of the present invention and executed by a processor 102 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
causing, by a mobile terminal, a communication with a first communication network;
detecting a change in a communication status between the mobile terminal and a second communication network;
determining a set of network notification parameters, wherein the network notification parameters identify one or more parameters of a communication with the second communication network, wherein the network notification parameters include a first indication of whether a user of the mobile terminal is active, and wherein the network notification parameters further includes a second indication of a likelihood of the mobile terminal communicating with the first communication network; and in response to detecting the change in the communication status between the mobile terminal and the second communication network, causing transmission of a network notification message to the first communication network, wherein the network notification message includes the network notification parameters, and wherein the transmitting of the network notification message enables a determination of an anticipated traffic at the first communication network.

2. The method of claim 1, further comprising receiving reconfiguration information for the first communication network in response to causing transmission of the network notification message.

3. The method of claim 2, wherein the reconfiguration information comprises a change to at least one configuration parameter of the first communication network that to conserve power of the mobile terminal.

4. The method of claim 2, wherein the reconfiguration information comprises a change to at least one configuration parameter of the first communication network to avoid interference with the second communication network when the mobile terminal is communicating via the second communication network.

5. The method of claim 1, wherein the network notification message comprises at least one of a power preference indication or in-device coexistence information.

6. The method of claim 1, wherein the network notification message is caused to be transmitted in response to a change in a communication profile of the mobile terminal.

7. The method of claim 1, wherein the change in the communication status between the mobile terminal and the second communication network comprises an establishment of a connection with the second communication network, initiation of data transfer via the second communication network, a change in an application communicating via the second communication network, a change in delay tolerance associated with the second communication network, a desire for a power saving configuration on the second communication network, a change in a preference for a continuous connection for the second communication network, or a change in a battery status of the mobile terminal.

8. The method of claim 1, wherein the network notification message comprises at least one of data indicating a particular application is active, data indicating whether an application is delay tolerant, data indicating whether an application is executing in a background manner, data indicating a request for a power saving configuration, data indicating a data transmission status, or data indicating a device battery status.

9. The method of claim 1, wherein the user of the mobile terminal is determined to be active, when a key at the mobile terminal is pressed within a time period and/or when a screen saver is not currently enabled at the mobile terminal.

10. The method of claim 1, wherein the change in the communication status between the mobile terminal and the second communication network comprises in change in a frequency with which the mobile terminal communicates with the second communication network.

11. An apparatus comprising at least one processor and at least one memory including computer program instructions, the at least one memory and the computer program instructions configured to, with the at least one processor, cause the apparatus at least to:

cause a communication with a first communication network;

detect a change in a communication status between the apparatus and a second communication network;

determine a set of network notification parameters, wherein the network notification parameters identify one or more parameters of a communication with the second communication network, wherein the network notification parameters include a first indication of whether a user of the mobile terminal is active, and wherein the network notification parameters further includes a second indication of a likelihood of the mobile terminal communicating with the first communication network; and in response to detecting the change in the communication status between the apparatus and the second communication network, cause transmission of a network notification message to the first communication network, wherein the network notification message includes the network notification parameters, and wherein the transmitting of the network notification message enables a determination of an anticipated traffic at the first communication network.

12. The apparatus of claim 11, wherein the apparatus is further configured to at least receive reconfiguration information for the first communication network in response to causing transmission of the network notification message.

13. The apparatus of claim 12, wherein the reconfiguration information comprises a change to at least one configuration parameter of the first communication network that to conserve power of the apparatus.

14. The apparatus of claim 12, wherein the reconfiguration indication comprises a change to at least one configuration parameter of the first communication network to avoid interference with second communication network when the apparatus is communicating via the second communication network.

15. The apparatus of claim 11, wherein the network notification message comprises at least one of a power preference indication or in-device coexistence information.

16. The apparatus of claim 11, wherein the network notification message is caused to be transmitted in response to at least one of an activation of another connection or a change in a communication profile of the apparatus.

17. An apparatus comprising at least one processor and at least one memory including computer program instructions, the at least one memory and the computer program instructions configured to, with the at least one processor, cause the apparatus at least to:

receive, from a mobile terminal, a network notification message, wherein the network notification message is received over a first communication network, wherein the network notification message indicates that the mobile terminal is in communication with at least a second communication network, wherein the network notification message further indicates whether a user of the mobile terminal is active, and wherein the network notification message further indicates a likelihood of the mobile terminal communicating with the first communication network;

determine, based at least on the network notification message, one or more network configuration parameters for the first communication network, wherein the network configuration parameters comprise settings that optimize an operation of the mobile terminal with the first communication network and the second communication network, and wherein the one or more network configuration parameters includes an anticipated traffic at the first communication network; and configure, based at least on the one or more network configuration parameters, the first communication network.

18. The apparatus of claim 17, wherein the network notification message comprises a power preference indication.

19. The apparatus of claim 17, wherein the network notification message comprises in-device coexistence information.

20. The apparatus of claim 17, wherein the network configuration parameters are adapted to minimize interference with the second communication network when the mobile terminal is communicating via the second communication network.

21. The apparatus of claim 17 wherein the network configuration parameters are determined to minimize power usage of the mobile terminal.

22. The apparatus of claim 17, wherein the configuration of the first communication network comprises a power saving setting, when the likelihood of the mobile terminal communicating with the first communication network does not exceed a threshold.

23. The apparatus of claim 17, wherein the configuration of the first communication network comprises a connection release of the mobile terminal, when the likelihood of the mobile terminal communicating with the first communication network does not exceed a threshold.

* * * * *